US012667079B2

(12) United States Patent
Beck et al.

(10) Patent No.: US 12,667,079 B2
(45) Date of Patent: Jun. 30, 2026

(54) PET TREAT VENDING MACHINE

(71) Applicant: Marvin Beck, Cleveland, OH (US)

(72) Inventors: Marvin Beck, Cleveland, OH (US);
Victor Eggenberger, Sebastopol, CA
(US)

(73) Assignee: Marvin Beck, Cleveland, OH (US)

( * ) Notice: Subject to any disclaimer, the term of this
patent is extended or adjusted under 35
U.S.C. 154(b) by 537 days.

(21) Appl. No.: 18/110,689

(22) Filed: Feb. 16, 2023

(65) Prior Publication Data

US 2023/0309508 A1    Oct. 5, 2023

Related U.S. Application Data

(60) Provisional application No. 63/327,392, filed on Apr.
5, 2022.

(51) Int. Cl.
A01K 5/01        (2006.01)
(52) U.S. Cl.
CPC ................................. A01K 5/0114 (2013.01)
(58) Field of Classification Search
CPC ...................................................... A01K 5/0114
See application file for complete search history.

(56) References Cited

U.S. PATENT DOCUMENTS

| | | | |
|---|---|---|---|
| 5,070,986 A | 12/1991 | Hoffman et al. | |
| 7,032,776 B2 | 4/2006 | Hieb | |
| 7,446,302 B2 | 11/2008 | Mason et al. | |
| 7,950,578 B2 | 5/2011 | Majer | |
| 2005/0263082 A1* | 12/2005 | Rutledge | A01K 5/0275 |
| | | | 119/51.01 |
| 2010/0089327 A1* | 4/2010 | Gross | A01K 5/0114 |
| | | | 119/51.01 |
| 2012/0277904 A1* | 11/2012 | Pritchard | G07F 11/165 |
| | | | 221/154 |
| 2014/0361032 A1* | 12/2014 | Czarnek | A61J 7/02 |
| | | | 221/277 |
| 2016/0000036 A1* | 1/2016 | Cornwell, Jr. | A01K 5/0291 |
| | | | 119/51.11 |
| 2018/0084755 A1* | 3/2018 | Hirschl | A01K 11/006 |

* cited by examiner

*Primary Examiner* — Gene O Crawford
*Assistant Examiner* — Ayodeji T Ojofeitimi
(74) *Attorney, Agent, or Firm* — Kramer Law Clinic

(57)        ABSTRACT
A dog treat vending machine comprises a housing having
two alternate dispensing mechanisms, respectively spiral
method and rotating cylinder method, a light array having an
emitter and a plurality of detectors, a controller device which
is able to interface with a plurality of RFID tags and process
feedback data generated by the RFID tags, and means for
limiting the number of products dispensed in association
with a selected one of the RFID tags in a selected period. A
method for dispensing products is also provided.

14 Claims, 11 Drawing Sheets

PET TREAT VENDING MACHINE

This application claims priority to U.S. Prov. Application Ser. No. 63/327,392 filed on Apr. 5, 2022, which is expressly incorporated herein by reference.

TECHNICAL FIELD

Background

Generally, pet owners or handlers need to take enough treats with them when accompanying their pets on walks or in similar situations. When a necessary need for treats arises but pet owners are far from where the treats are being kept or they may have difficulties in acquiring those, they are likely to suffer a loss for either cutting short their scheduled plan or interrupting their ongoing activities. A pet owner's access to treats is particularly important if the pet is in a need of replenishing energy but the owner forgets to take any with him or her. In addition, a pet may be aware of its need for a treat and be unable to communicate that need with its owner or handler.

U.S. Pat. No. 6,886,715 B2 discloses a vending system for pet items. This reference relies largely on an exchange medium receptor, which could identify pre-selected exchange, rather than a system connected to a network which would allow pet owners to set up an initial limitation for a dog's accessible treats per day and not to bring any cash or card with them.

U.S. Pat. No. 7,032,776 B2 discloses an apparatus and rotating method for dispensing products, and U.S. Pat. No. 5,070,986 discloses a spiral method of dispensing goods. These two references respectively apply one way of dispensing, rather than a vending system having both methods, which would allow a client still have access to dog treats when one way of dispensing does not work well.

Accordingly, a vending machine readily available to pet owners or handlers while out in public is desirable. Further, a network system that allows customers to set up an account limiting the number of treats a pet can obtain within a limited time period is desirable.

BRIEF SUMMARY

The systems and methods discussed herein allow clients to set up an initial account to limit the number of pet treats that can be acquired within a specific period of time. This is achieved by providing a system for stocking and dispensing treats, comprising: a housing having a dispensing end and a dispensing detector adjacent to the dispensing end; a tag sensor located in the housing, wherein the tag sensor detects a pet tag in close proximity to the housing end and receives signals from the pet tag; a controller device in the housing, wherein the controller device receives signals from the tag sensor, determines a number of products in a selected time period associated with the pet tag; a dispensing device located in the housing and operatively connected to the controller device; and controls the dispensing of products limited to the number of products in the selected time period, wherein the product is dispensed through the dispensing end and through the dispensing detector, wherein the dispensing detector updates a transaction by sending a signal to the controller device.

Then, providing a method of dispensing products, comprising the steps of: providing a housing having a controller device, a dispensing device connected to the housing, a dispensing detector in the bottom of the housing, and tags capable of interacting with the controller device; determining a number of products dispensed in association with a selected one of the tags in a selected time period; detecting a tag within a specified range of the controller device; and conveying products limited by the number outside of the housing by activating the dispensing device.

Finally, a method of limiting a number of products in a selected time period, comprising the steps of: detecting by a pet tag sensor a tag in proximity to a dispensing device; receiving a first number limiting products in a selected time period associate with the pet tag; controlling a dispensing device to dispense products limited by the first number; and uploading a second number based on the products dispensed to a controller device.

DETAILED DESCRIPTION OF THE PREFERRED EMBODIMENTS

Figure 1:
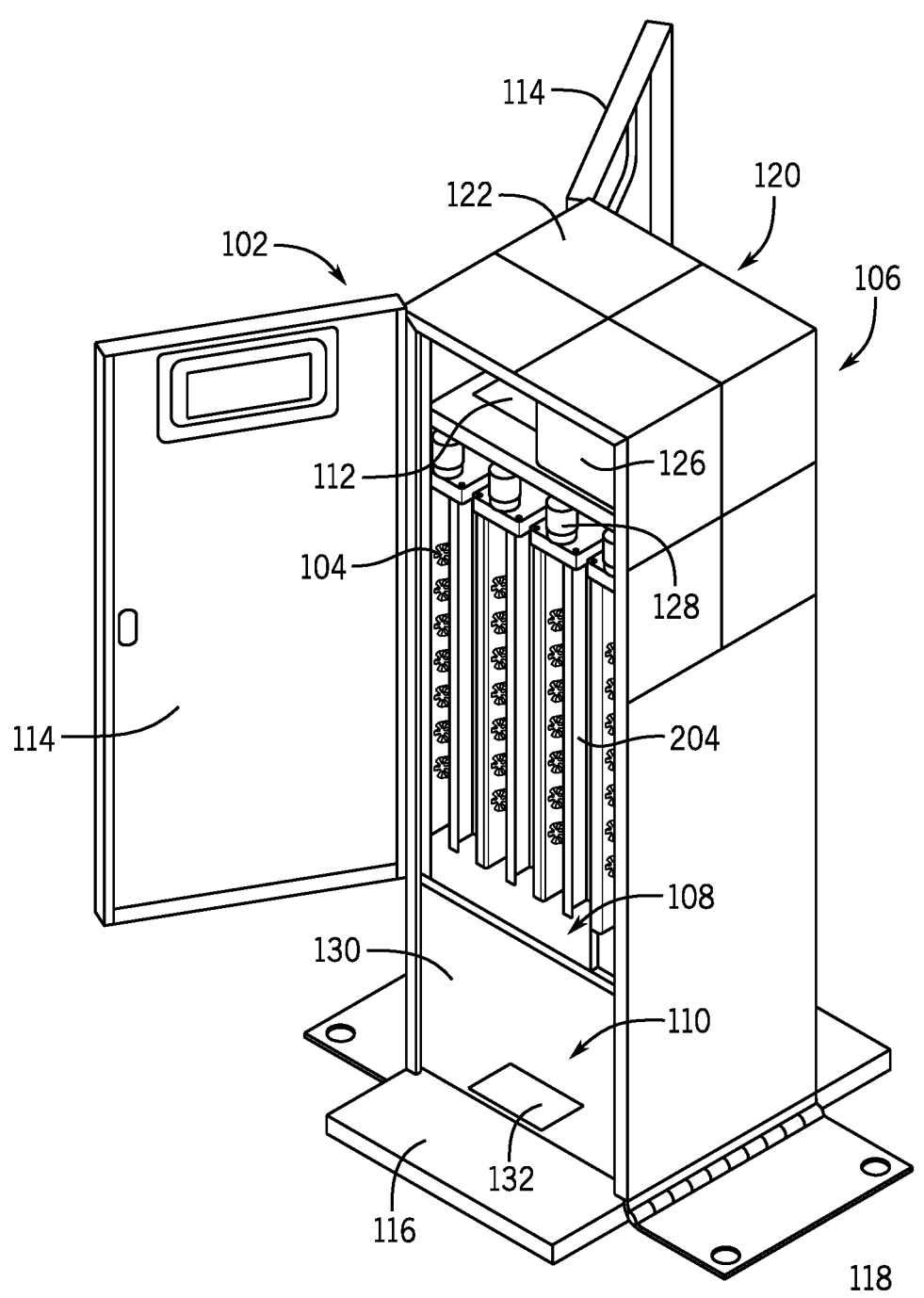
FIG. 1 is an isometric view of a dispensing device according to one exemplary embodiment.

A dog treat vending machine as described herein is generally indicated by reference numeral 100 in the various Figures of the attached drawings wherein numbered elements in the figures correspond to like numbered elements herein. The following describes a system and method related to a system for dispensing products, more specifically a dog treat vending machine. Although "dog" and "dog treats" are used when describing the systems and methods herein, it is understood that is some embodiments, any type of pet, treat, or product can be implemented.

Figure 2:
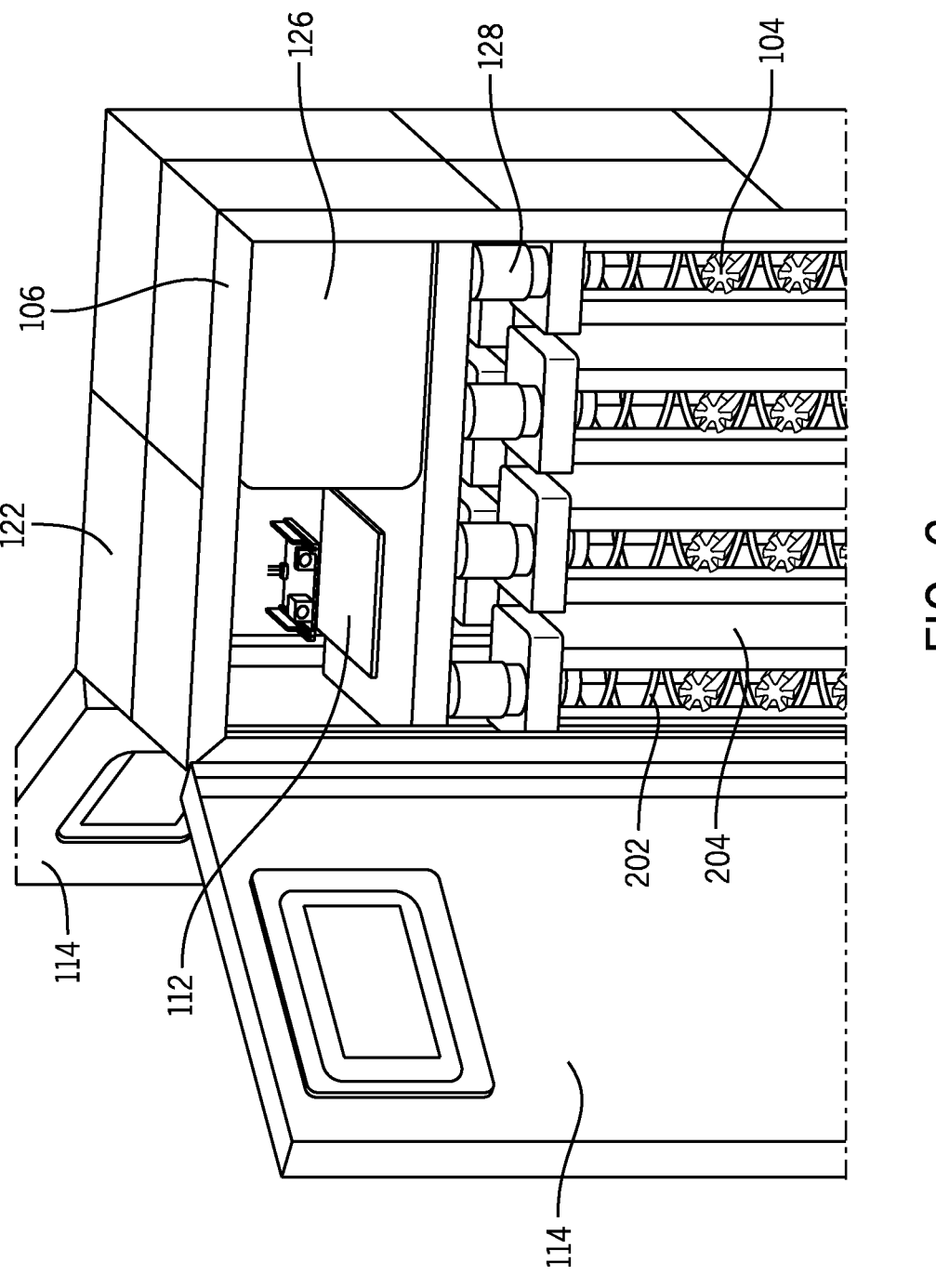
FIG. 2 is an isometric view of the upper compartment according to one exemplary embodiment.

FIGS. 1 and 2 show an exemplary system for dispensing products including a dispensing device 102 to dispense products 104 within a housing 106 having a dispensing end 108 and a presentation area 110. The dispensing device is operated by a controller device 112.

In some embodiments, the housing 106 of the dispensing device 102 is symmetric with a door 114 on the front and back sides. The front and back doors 114 can be symmetric, hinged on one side and locked on the other for restocking and access to the machine's internals. The housing 106 may be roughly square in shape with a rectangular base plate 116. A pair of folding anchor plates 118 deploy to the sides so that the housing 106 can be staked to the ground or otherwise fastened to a flat surface. In alternative embodiments, the housing 106 can be made from lightweight, corrosion resistant materials, such as aluminum, which can be anodized after fabrication. Upper exterior surfaces 120 can be utilized for mounting solar cells 122. The upper inside compartment 124 houses the battery 126 and a controller device 112. In some embodiments, the source of power for the dispensing device 102 is the battery 126 that recharges by the solar cells 122 and by a serviceman recharging or swapping out batteries 126 during a restock operation.

Figure 8:
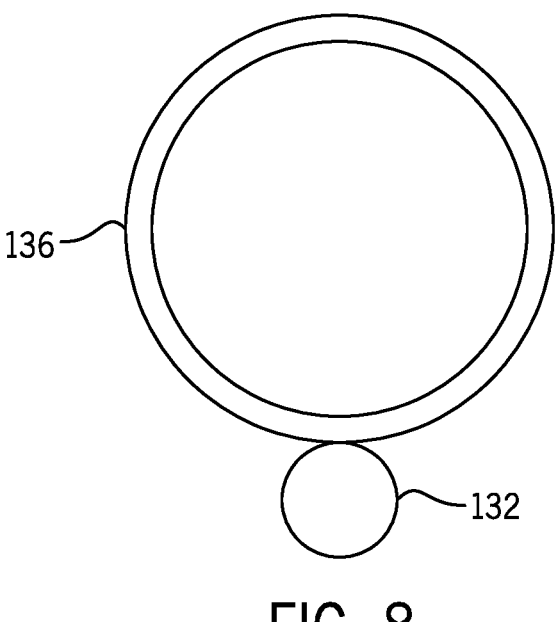
FIG. 8 is a top-elevational view of a dog collar.

At the bottom of the housing 106 is the presentation area 110, where the dispensed product 104 can be retrieved. The presentation area 110 can be opened by pushing either a front or back flap door 130. These flap doors 130 hinge at the top and swing inwards, a small spring as well as gravity is used to keep the flap doors 130 closed. Because the dispensing device 102 is initiated by a response from a tag 132, a sensor 134 can be placed at the presentation area 110 so only when a tag 132 is within range or begins to open the flap doors 130 on the presentation area 110 will the transaction initiate. In some embodiments, the tag 132 can be worn on a dog collar 136 (see FIG. 8).

Figure 3:
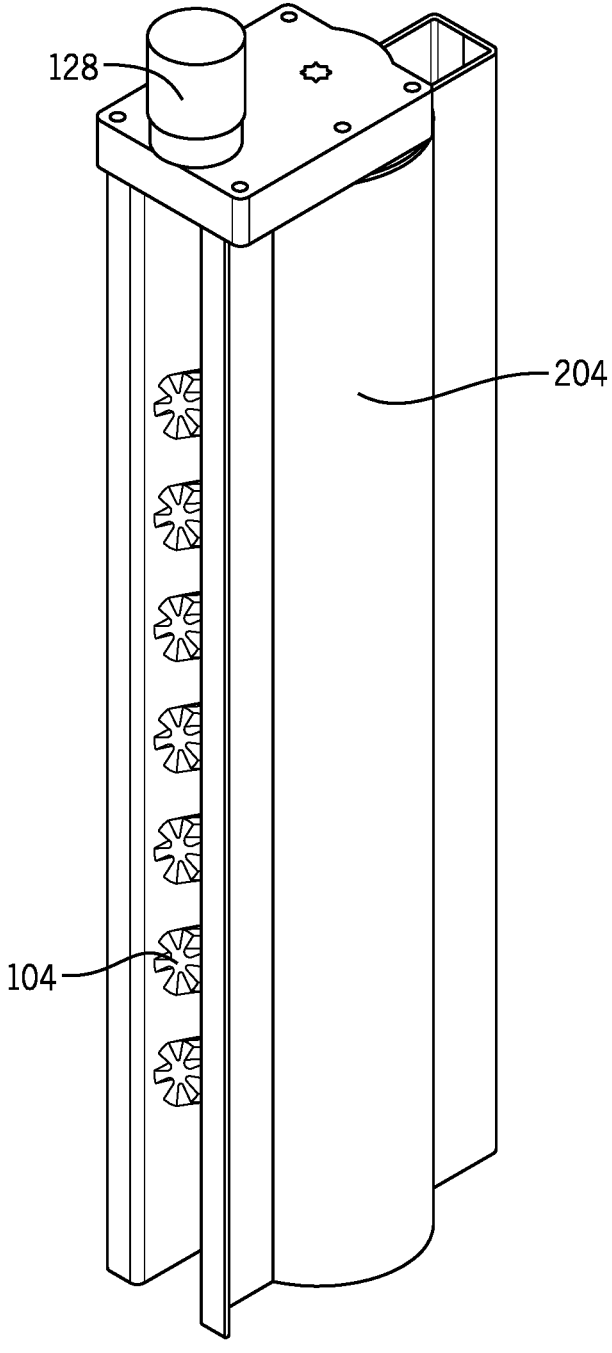
FIG. 3 is an isometric view of the spiral coil vend module mechanism according to one exemplary embodiment.
Figure 4:
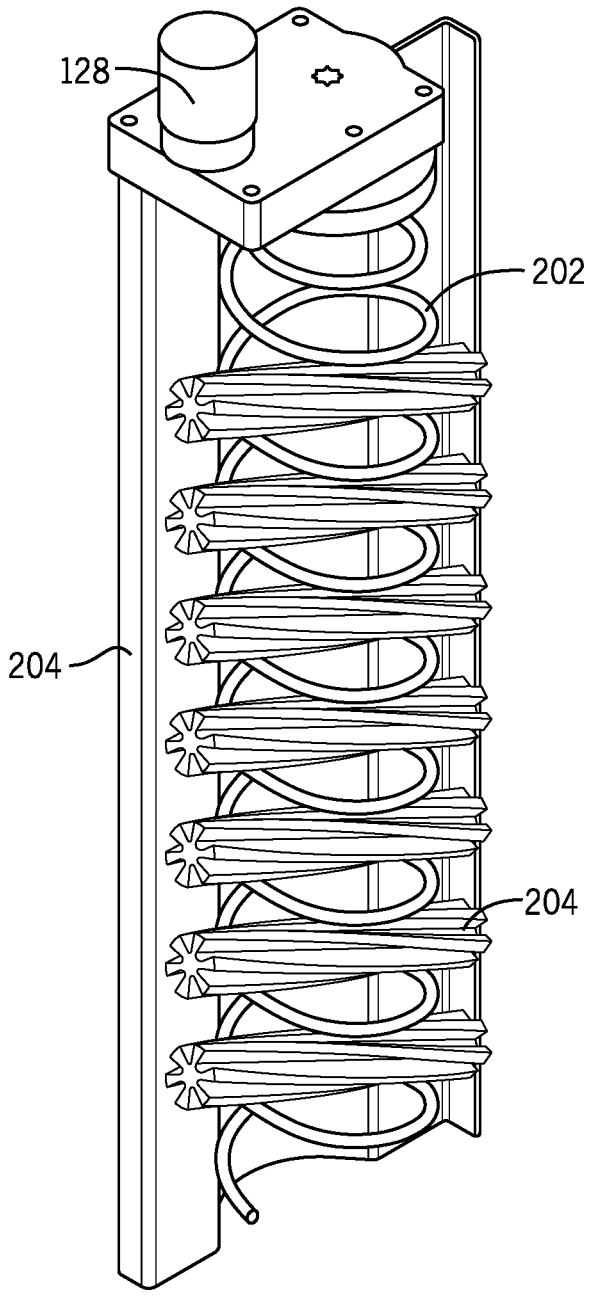
FIG. 4 is a cross-sectional view of the spiral coil vend module mechanism according to one exemplary embodiment.

In an exemplary embodiment shown in FIGS. 3 and 4, the dispensing device 102 would utilize at least one vertically oriented vending spiral coil 202 shaped as a helix where a vend motor 128 is located above and the spiral points downwards. A plurality of guides 204, which may be made of sheet metal, partially envelopes the spiral coil 202 while constraining the products 104 to lie between two points of the spiral coil 202. The distance between the interior of the guides 204 may be greater than the maximum diameter or width of the product 104 to provide clearance for the products 104 to slide downwards between the interior of the guides 204. The products 104 are also at an angle to the center line of the spiral coil 202 corresponding to the helix angle of the spiral coil 202. The low, or downward pointing end of the products 104 contacts the back flange of the guides 204, preventing the products 104 from slipping out from between the guides 204. In some embodiments, several of these guides 204 are placed in an alternation pattern to maximize storage capacity within the housing 106. When the vend motor 128 revolves once, the spiral coil advances by one pitch, thereby dropping the bottom product 104 out of the spiral coil 202. The remaining products 104 advance downward by one pitch for the next transaction. The product 104 falls to the bottom of the housing 106 into the presentation area 110.

Figure 5:
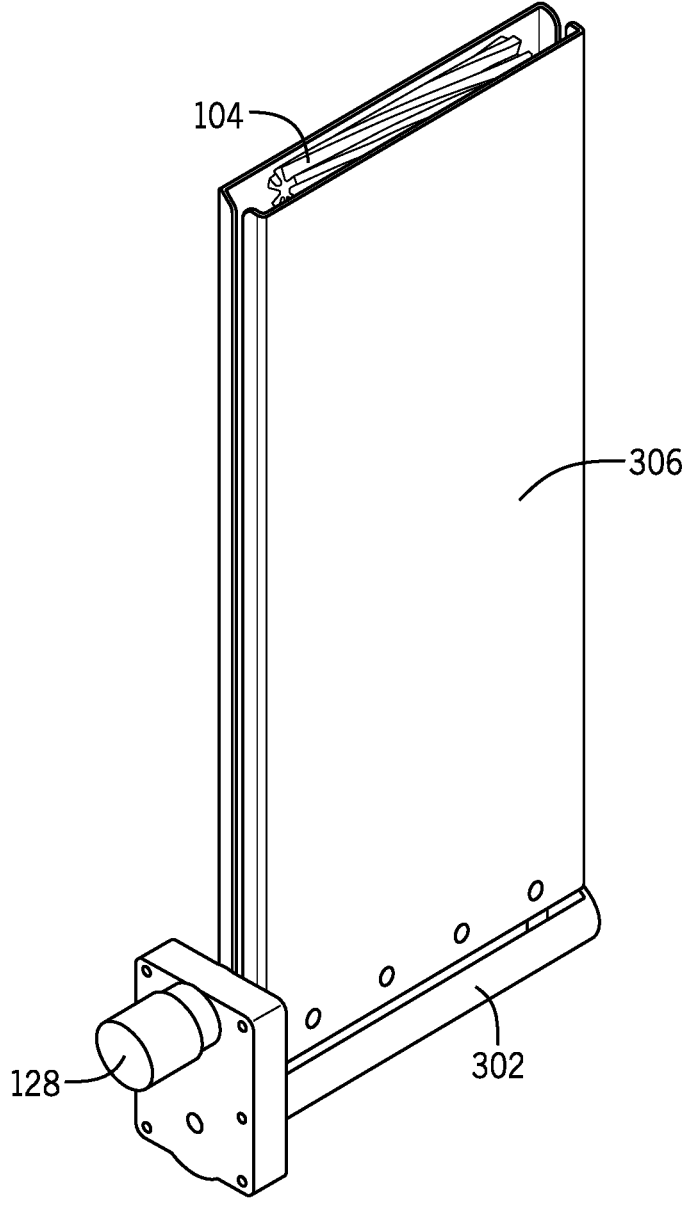
FIG. 5 is an isometric view of the rotating cylinder vend module mechanism according to one exemplary embodiment.
Figure 6:
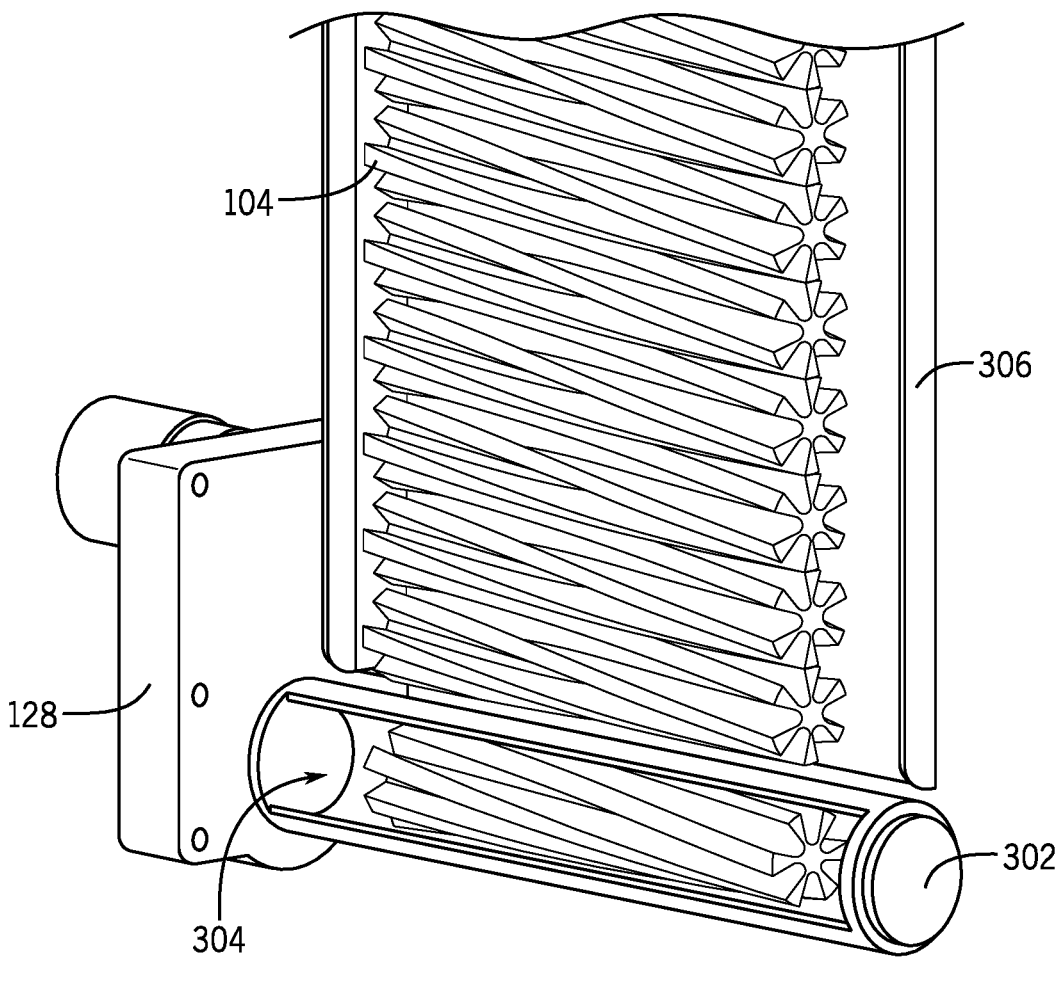
FIG. 6 is a cross-sectional view of the rotating cylinder vend module mechanism according to one exemplary embodiment.
Figure 7:
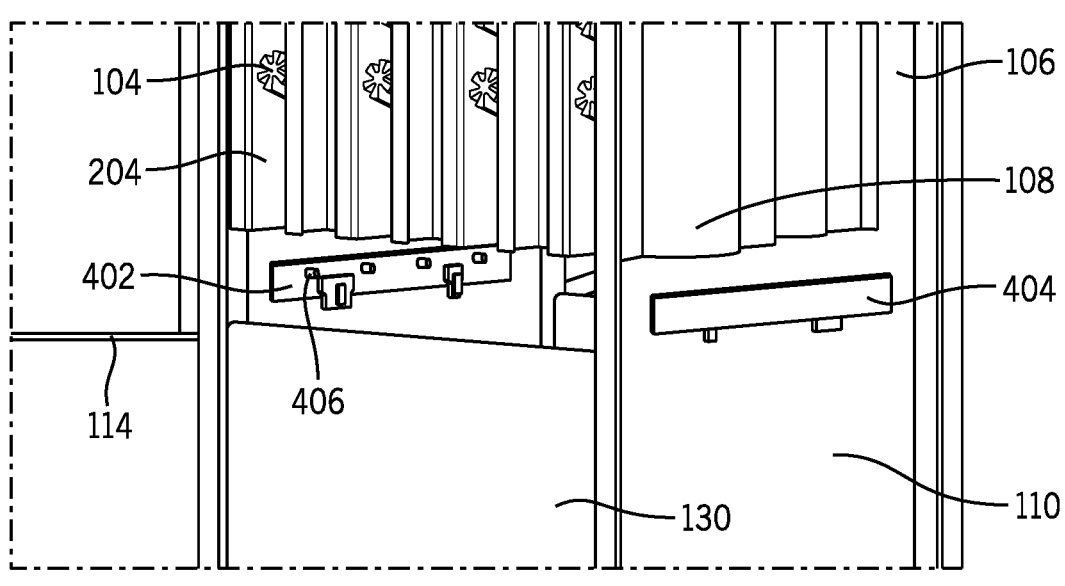
FIG. 7 is an isometric view of the light curtain.

In another exemplary embodiment shown in FIGS. 5 and 6, the dispensing device 102 would utilize a rotating cylinder 302 with a "U"-shaped opening 304 cut down the length of it. The cylinder 302 is rotated by a vend motor 128. When the opening 304 is facing downward, the back of the cylinder 302 surface is pointing upwards towards a magazine 306 where the products 104 are dispensed from. As the cylinder 302 rotates, the opening 304 presents itself upwards to the products 104, until a product 104 falls from the magazine 306 into the opening 304. The products 104 are stored in a magazine 306 which allows the products 104 to feed downwards by gravity into the cylinder 302. Then the cylinder 302 rotates a half rotation and drops the product 104 out into the presentation area 110.

As products 104 fall down into the presentation area 110 after being dispensed, the dispensed products 104 pass through a dispensing detector, namely, a light array 402 to detect the falling product 104, acknowledging the transaction. The light array 402 consists of both a plurality of emitters 404 and a plurality of detectors 406. In alternative embodiments, the emitters 404 may be IR LEDs and the detectors 406 may be photo-transistor pairs. Each emitter 404 produces a narrow beam of infrared light and the corresponding detector 406 detects the beam. When a product 104 breaks the beam of light the detector 406 detects this, sending out a signal to the controller device 112. In some embodiments, the detectors 406 may be arranged in a linear pattern spaced at a pitch suitable to detect a product 104. The smaller the product 104 is, the smaller the pitch needs to be. If the product 104 is smaller than the distance between detectors 406, it may fall through and not break any of the light beams produced by the emitters 404, passing through undetected.

Figure 9:
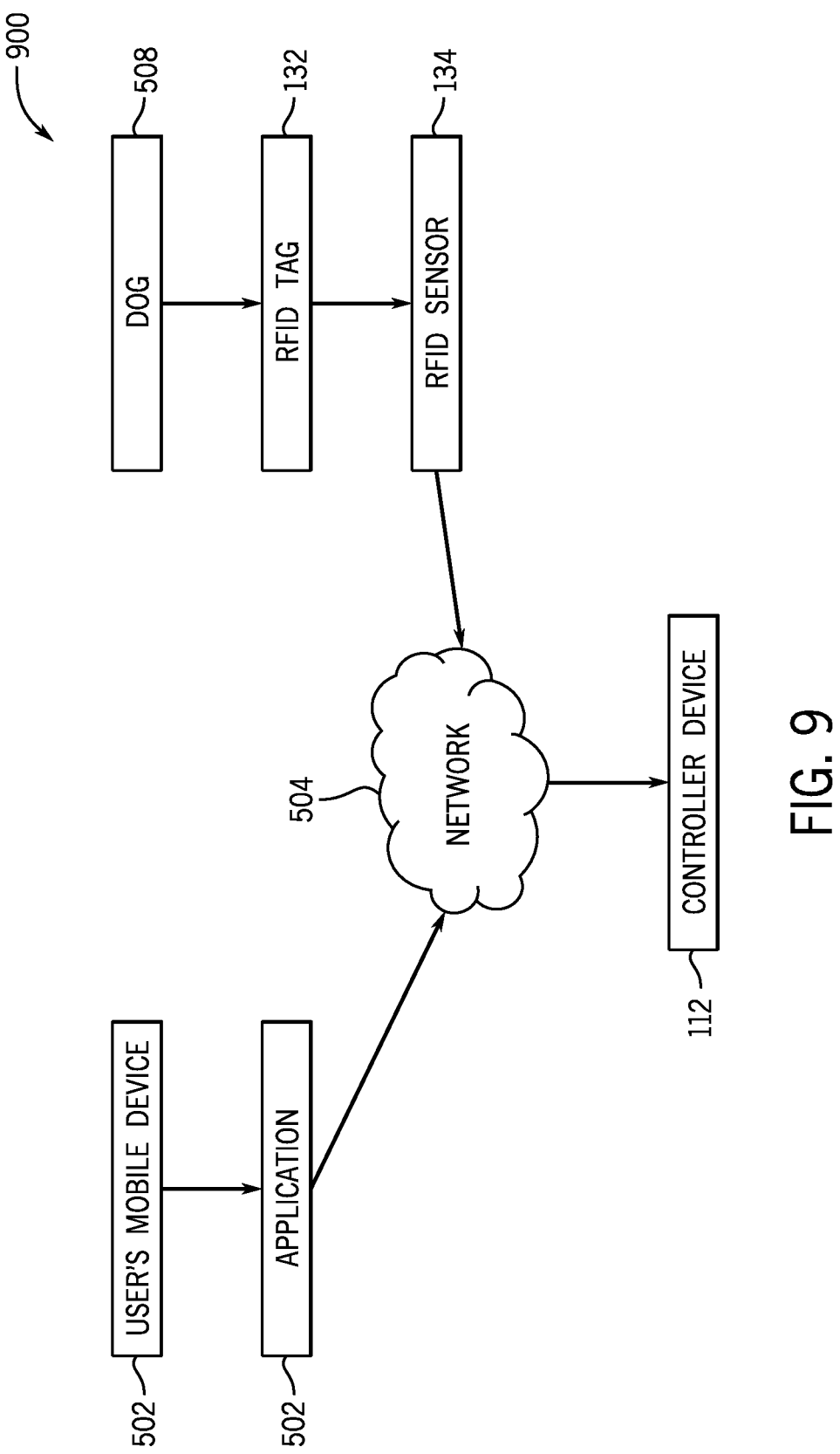
FIG. 9 is a schematic representation of a system communicating between the dog owner, an RFID tag, and a controller device.

Referring now to FIG. 9, an exemplary operating environment 900 showing communication between system components via a network 504 is shown. The controller device 112 can operate the dispensing device 102, store inventory of the products 104 and other status information, and communicate with a mobile device 502 belonging to a customer via the network 504 such as WiFi. The controller device 112 provides a means to control the vend process and monitor feedback from sensors. Aside from controlling the dispensing device 102, the controller device 112 stores and transmits its serial number, commands, and status to the network 504 when the controller device 112 establishes communication with it. The user will need an application 506 installed on their mobile device 502 to operate the dispensing device 102. The application 506 includes the user's identification and billing information. The user can set an escrow for their dog 508 to use. The controller device 112 will continuously scan for a connection to the network 504, such as by WiFi connection from a user's mobile device 502, and once established the controller device 112 can connect to its network 504 to update its status and receive commands. If a tag 132 activates the dispensing device 102 by being within range and the user's mobile device 502 establishes a connection to the network 504 a transaction can occur.

Figure 10:
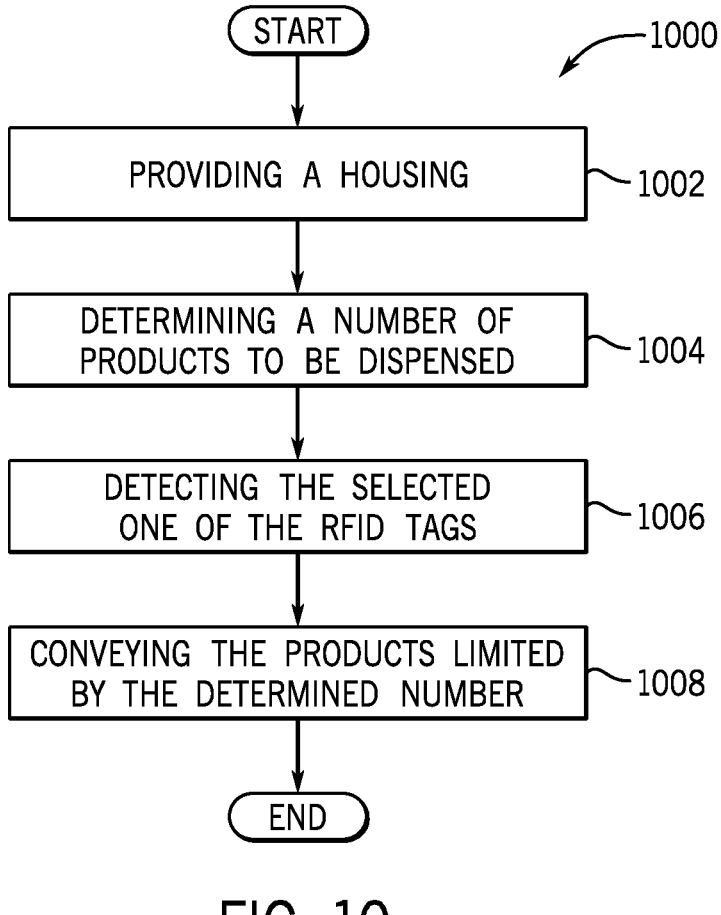
FIG. 10 is a flowchart demonstrating the logic flow of the function of the dispensing device.

Referring now to FIG. 10, an exemplary method 1000 for limiting a number of products will now be described. At block 1002, method 1000 includes providing a housing 106 having a controller device 112, a dispensing device 102 connected to the housing 106, a dispensing detector in the bottom of the housing 106, and RFID tags 132 capable of interacting with the controller device 112. The dispensing detector can be a light array 402 having an emitter 404 and a plurality of detectors 406 as described above. Additionally, in one embodiment, the dispensing device includes a spiral coil 202 connected to the housing 106, the spiral coil 202 is mounted vertically in the housing 106. The spiral coil 202 conveys the products 104. In another embodiment, the dispensing device includes a rotating cylinder 302 connected to the housing 106. The rotating cylinder 302 can convey the products 104.

At block 1004, method 1000 includes determining a number of products 104 to be dispensed in association with a selected one of the RFID tags 132 in a selected time period. In some embodiments, a selected time period may be one day or one week. Accordingly, in one example, a selected one of the RFID tags 132 can be limited to 10 products in a 24-hour time period. At block 1006, method 1000 includes detecting the selected one of the RFID tags 132 within a specified range of the controller device 112. As discussed herein, the RFID tags 132 are removable attached to dog collars 136.

At block 1008, method 1000 includes conveying products 104 limited by the determined number of products outside of the housing 106 by activating the dispensing device. In some embodiments, conveying the products 104 includes detecting a disruption within the dispensing detector (e.g., the light array 402) to deactivate the dispensing device and to ensure successful product dispensing. In some embodiments, the network 504 data determines if a user has reached a maximum number of products within the selected time period. If the user has not reached the maximum number of products dispensed within a selected time period, the network 504 will communicate with the controller device 112 to execute conveying the product 104. Finally, after the product 104 is dispensed and passes through the light array 402, the light array 402 will communicate with the controller device 112 to determine if the product 104 has been successfully dispensed.

Figure 11:
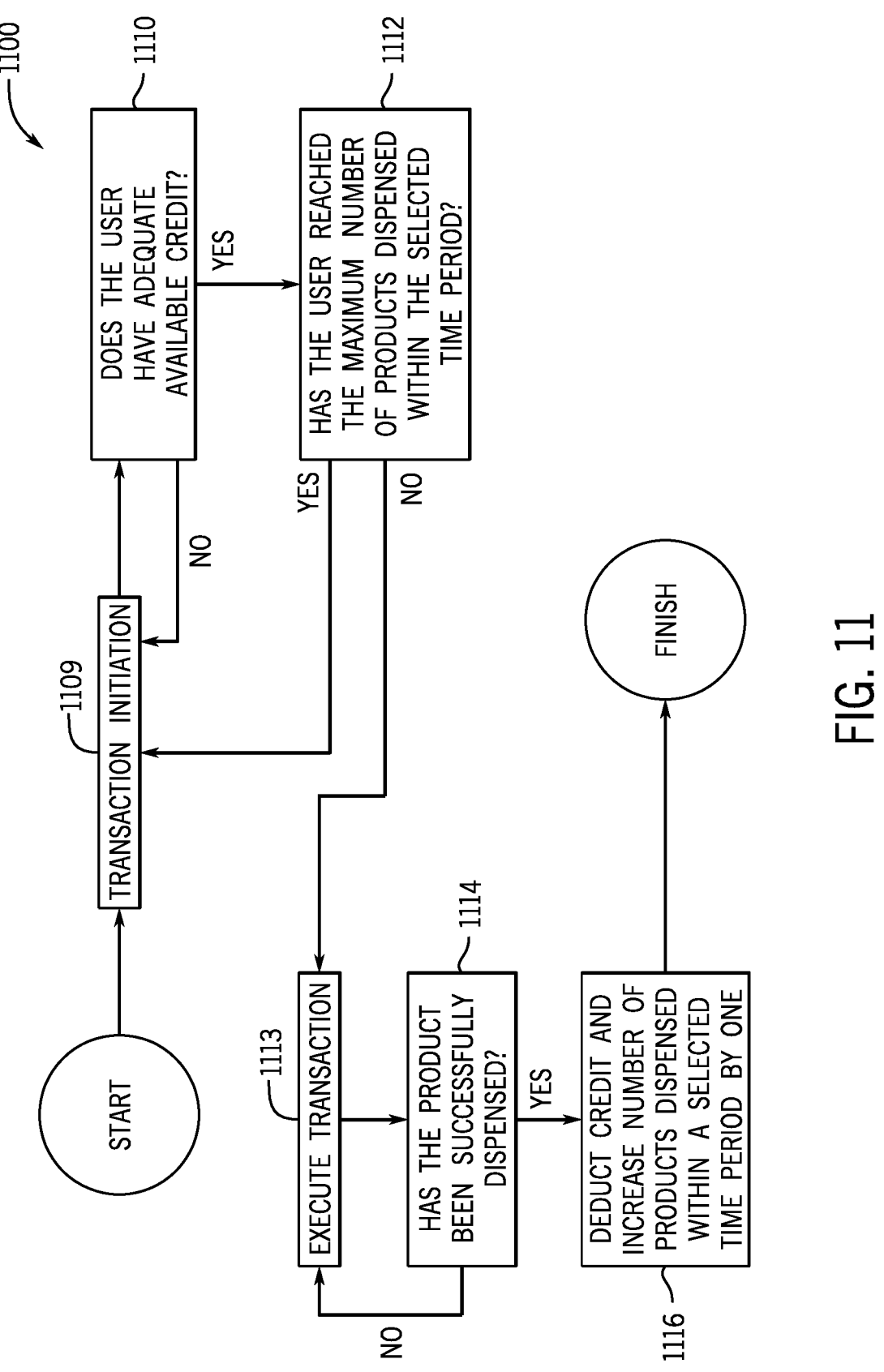
FIG. 11 is a flow chart of the method of limiting a number of products in a selected time period according to one exemplary embodiment.

As shown in FIG. 11, the transaction is initiated at block 1109 and the network 504 data determines if a user has adequate available credit at block 1110 to use with the dispensing device 102. If the user has adequate credit, the network 504 will then determine if the user has reached the maximum number of products 104 dispensed within a selected time period at block 1112. In some embodiments, a selected time period may be one day or one week. If the user has not reached the maximum number of products 104 dispensed within a selected time period at block 1112, the network 504 will communicate with the controller device 112 to execute the transaction at block 1113. Finally, after the product 104 is dispensed and passes through the light array 402 as described above, the light array 402 will communicate with the controller device 112 to determine if the product 104 has been successfully dispensed at block 1114. If not, the transaction will re-execute. If so, credit would be deducted from the user's account and the number of products 104 dispensed within a selected time period would increase by one at block 1116.

In some embodiments, the user may be required to authenticate the transaction on the application 506 on their mobile device 502. In other embodiments, the transaction can initiate automatically once and tag 132 is detected and a network 504 connection is established with a user's mobile device 502. After the transaction, the dispensing device 102 status including inventory of the products 104, would be transmitted to the user's mobile device 502 and automatically update the network 504.

Figure 12:
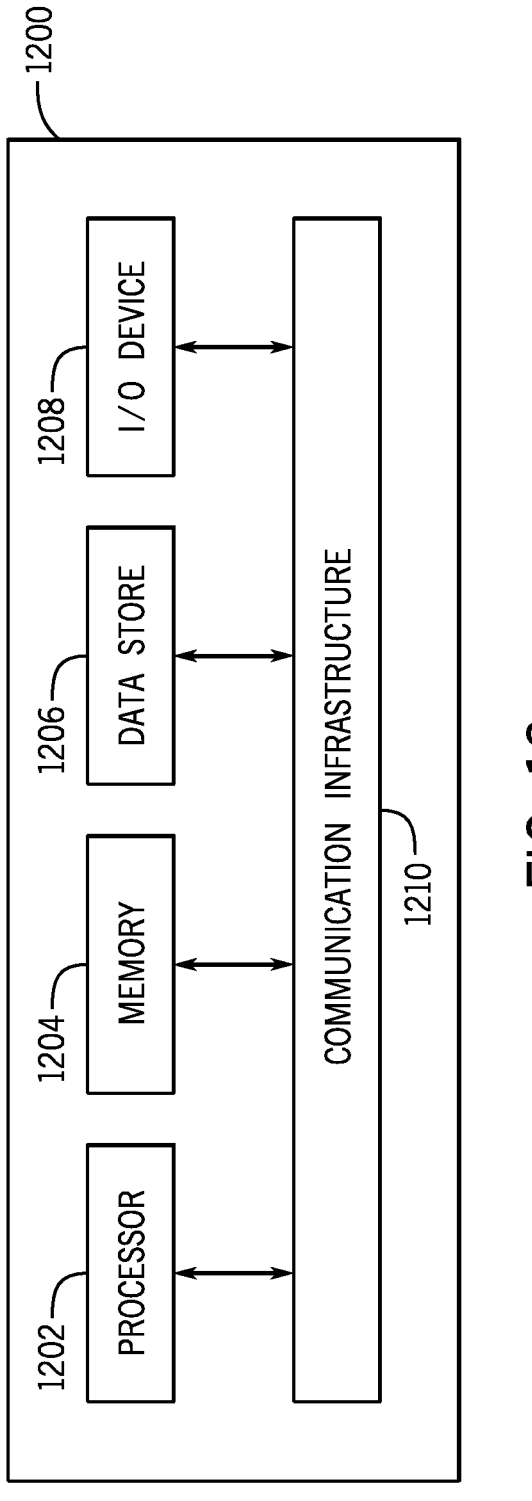
FIG. 12 is a communication infrastructure in the dispensing device according to one exemplary embodiment.

Referring now to FIG. 12, an exemplary computing system 1200 is shown that may be used to implement and/or execute the methods, functions, and components described herein. The computing system includes a processor 1202, a memory 1204, a data store 1206, and an I/O device 1208 each operatively connected for computer communication to a communications infrastructure 1210. The processor 1202 may include logic circuitry with hardware, firmware, and software architecture frameworks for facilitating the methods, functions, and components as described herein. In some embodiments, the processor 1202 may store application frameworks, kernels, libraries, drivers, application program interfaces, among others, to execute and control hardware and functions discussed herein. In some embodiments, the memory 1204 and/or the data store 1206 may store similar components as the processor 1202 for execution by the processing unit. The I/O device 1208 may include one or more input-output devices for providing visual, audio, and/or or tactile input and/or output from and/or to another entity (e.g., an operator on a manufacturing line). The I/O device 1208 may be a monitor, display, keyboards, touch screens, speakers, among other devices. The communications infrastructure 1210 may include software and hardware to facilitate communication between the components of the computing system 1200 and/or other components of a network and/or cloud service. Specifically, the communications infrastructure 1210 may include network interface controllers, other hardware and software that manages and/or monitors connections, and/or controls bi-directional data transfer using, for example, a communication network.

Unless specified, the methods disclosed herein may be performed in any order. The order of the process steps and/or operations discussed herein do not limit the scope of the embodiments as claimed below. Those of ordinary skill in the art will conceive of other alternative embodiments upon reviewing this disclosure. Thus, the embodiments are not to be limited to the above description but is to be determined in scope by the claims which follow.

What is claimed is:

1. A system for dispensing pet treats, comprising:
   a housing configured to hold and dispense pet treats,
   the housing having a dispensing end formed in the housing and a spiral coil mounted vertically in the housing, and wherein the spiral coil delivers the pet treats at the dispensing end through the housing;
   a light array positioned adjacent to the dispensing end, the light array having an emitter and a plurality of detectors configured to detect individual pet treats as they are dispensed at the dispensing end; and
   a controller device operatively connected to the spiral coil and the light array and configured to interface with a plurality of RFID tags, each RFID tag being affixable to an animal collar, wherein the controller device:
      detects a selected one of the plurality of RFID tags when the selected RFID tag is within a specified range of the controller device;
      determines a maximum number of pet treats to be dispensed in association with the selected RFID tag in a selected time period; and
      activates the spiral coil to convey the pet treats at the dispensing end limited by the maximum number of pet treats to be dispensed for the selected RFID tag in the selected time period.

2. The system of claim 1, wherein the system is operated by a dog wearing the selected one of the RFID tags.

3. The system of claim 1, wherein the pet treats are dog treats.

4. The system of claim 1, wherein a vend motor is mounted above the spiral coil.

5. The system of claim 4, wherein the pet treats each lie between two points of the spiral coil.

6. The system of claim 4, wherein the controller device activates the spiral coil by revolving the vend motor to advance the spiral coil advancing by one pitch, one of the pet treats dropping out of the spiral coil, and the remaining pet treats advance within the spiral coil downward by one pitch.

7. A method of dispensing pet treats, comprising:
   providing a housing having a controller device, a dispensing device connected to the housing, a dispensing detector in a bottom of the housing, and RFID tags capable of interacting with the controller device;
   detecting, by the controller device, a selected one of the RFID tags when the selected RFID tag is within a specified range of the controller device;

in response to detecting the selected RFID tag, connecting to a network to obtain a maximum number of pet treats to be dispensed in a selected time period for the selected RFID tag; and activating the dispensing device to convey the pet treats outside of the housing based on the maximum number of pet treats to be dispensed in the selected time period for the selected RFID tag, wherein the dispensing device includes a spiral coil connected to the housing, the spiral coil is mounted vertically in the housing, and wherein the spiral coil conveys the pet treats.

8. The method of claim 7, wherein the RFID tags are removable attached to dog collars.

9. The method of claim 7, wherein the pet treats are dog treats.

10. The method of claim 7, including detecting a disruption within the dispensing detector indicating an individual pet treat has been dispensed at the dispensing device and communicating to the controller device that the individual pet treat has been successfully dispensed.

11. The method of claim 10, wherein the dispensing detector is a light array having an emitter and a plurality of detectors.

12. The method of claim 7, wherein the dispensing device comprises a vend motor that is mounted above the spiral coil.

13. The method of claim 12, wherein the pet treats each lie between two points of the spiral coil.

14. The method of claim 13, wherein activating the dispensing device includes revolving the vend motor once to advance the spiral coil by one pitch, whereby one of the pet treats dropping out of the spiral coil, and the remaining pet treats within the spiral coil advance downward by one pitch.

* * * * *